United States Patent [19]
Daws et al.

[11] Patent Number: 5,904,997
[45] Date of Patent: *May 18, 1999

[54] ABRASION RESISTANT CERAMIC INSULATION TILE AND METHOD

[75] Inventors: David Eric Daws, Los Alamitos; Harry Wellington Carpenter, Fallbrook, both of Calif.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/607,535

[22] Filed: Feb. 27, 1996

[51] Int. Cl.⁶ .................................................. B32B 18/00
[52] U.S. Cl. ........................... 428/699; 428/446; 428/701; 428/702
[58] Field of Search .................................... 428/699, 701, 428/702, 446

[56] References Cited

U.S. PATENT DOCUMENTS

| | | |
|---|---|---|
| 4,704,413 | 11/1987 | Nabeta et al. . |
| 5,009,961 | 4/1991 | Niebylski . |
| 5,024,979 | 6/1991 | Debaig-Valade et al. . |
| 5,209,979 | 5/1993 | Moehle et al. ...................... 428/446 X |
| 5,258,224 | 11/1993 | Langlois, Jr. et al. .............. 428/697 X |
| 5,275,980 | 1/1994 | Schilling, Jr. et al. . |
| 5,336,522 | 8/1994 | Balhadere et al. . |
| 5,348,917 | 9/1994 | Keller et al. ................................ 501/92 |
| 5,376,595 | 12/1994 | Zupancic et al. . |
| 5,436,083 | 7/1995 | Haluska et al. ...................... 428/698 X |

*Primary Examiner*—Daniel Zirker
*Attorney, Agent, or Firm*—Terry J. Anderson; Karl J. Hoch, Jr.

[57] ABSTRACT

In accordance with the present invention, there is provided an abrasion resistant ceramic insulation tile. The insulation tile is provided with a porous ceramic material having a surface. The insulation tile is further provided with a preceramic polymer which is permeated through the surface. The preceramic polymer forms an integral ceramic matrix with the porous ceramic material upon pyrolyzation.

9 Claims, 1 Drawing Sheet

ABRASION RESISTANT CERAMIC INSULATION TILE AND METHOD

BACKGROUND OF THE INVENTION

1. Technical Field

This invention relates to a ceramic tile having improved abrasion resistance and a method for applying an abrasion resistant layer. Specifically, it relates to ceramic insulation tiles used in high-temperature aircraft applications to protect metallic structure from hot engine exhaust.

2. Background Art

Ceramic insulation tiles are used in aircraft applications to protect the aircraft metallic structure from high temperature engine exhaust. Current insulation tiles provide adequate protection from high temperatures, but not from the abrasion caused by high velocity engine exhaust gases and associated erodents. Because high temperature insulation tile is composed of a porous lightweight ceramic, however, abrasion is particularly damaging to the physical integrity of the ceramic tile.

For example, engine exhaust gases such as $CO_2$, $O_2$, CO, and unburned fuel at high flow rates can abrade and erode insulation tile. Further, abrasion can arise from airborne particulate matter related to aircraft operation such as sand, dirt, soot, engine coatings, and turbine blade particles. Therefore a means of improving the abrasion resistance of such insulation tiles to extend the life of such tiles and reduce the cost of operation of the related aircraft is required.

Current methods of increasing the abrasion resistance of insulation tiles are costly and labor intensive. For example, one method is the chemical vapor deposition of SiC onto such tiles. This approach is costly and has limited improvements in abrasion resistance. Another approach is to spray a glass frit on the tile in multiple steps. This method requires extensive training of production personnel, is costly and very labor intensive. Further, the results of this process may not be highly reproducible because of the many manually controlled steps involved in the process.

Thus, one object of the invention is to provide a ceramic insulation tile that is resistant to abrasion from the types of gas flow and erodents present in high temperature aircraft operation.

Another object of the invention is to provide an abrasion resistant ceramic insulation tile that is low in cost and can be made with a process that is not labor intensive.

Another object of the invention is to provide a process to make an abrasion resistant ceramic insulation tile that is uncomplicated and, therefore, highly reproducible. This object will also reduce the cost of the resulting tile.

A further object of the invention is to provide an abrasion resistant ceramic insulation tile that is lightweight, which object is a mission critical parameter on all modern aircraft for performance and economy of operation.

SUMMARY OF THE INVENTION

In accordance with the present invention, there is provided an abrasion resistant ceramic insulation tile. The insulation tile is provided with a porous ceramic material having a surface. The insulation tile is further provided with a preceramic polymer which is permeated through the surface. The preceramic polymer forms an integral ceramic matrix with the porous ceramic material upon pyrolyzation.

DETAILED DESCRIPTION OF THE PREFERRED EMBODIMENT

Figure 1:
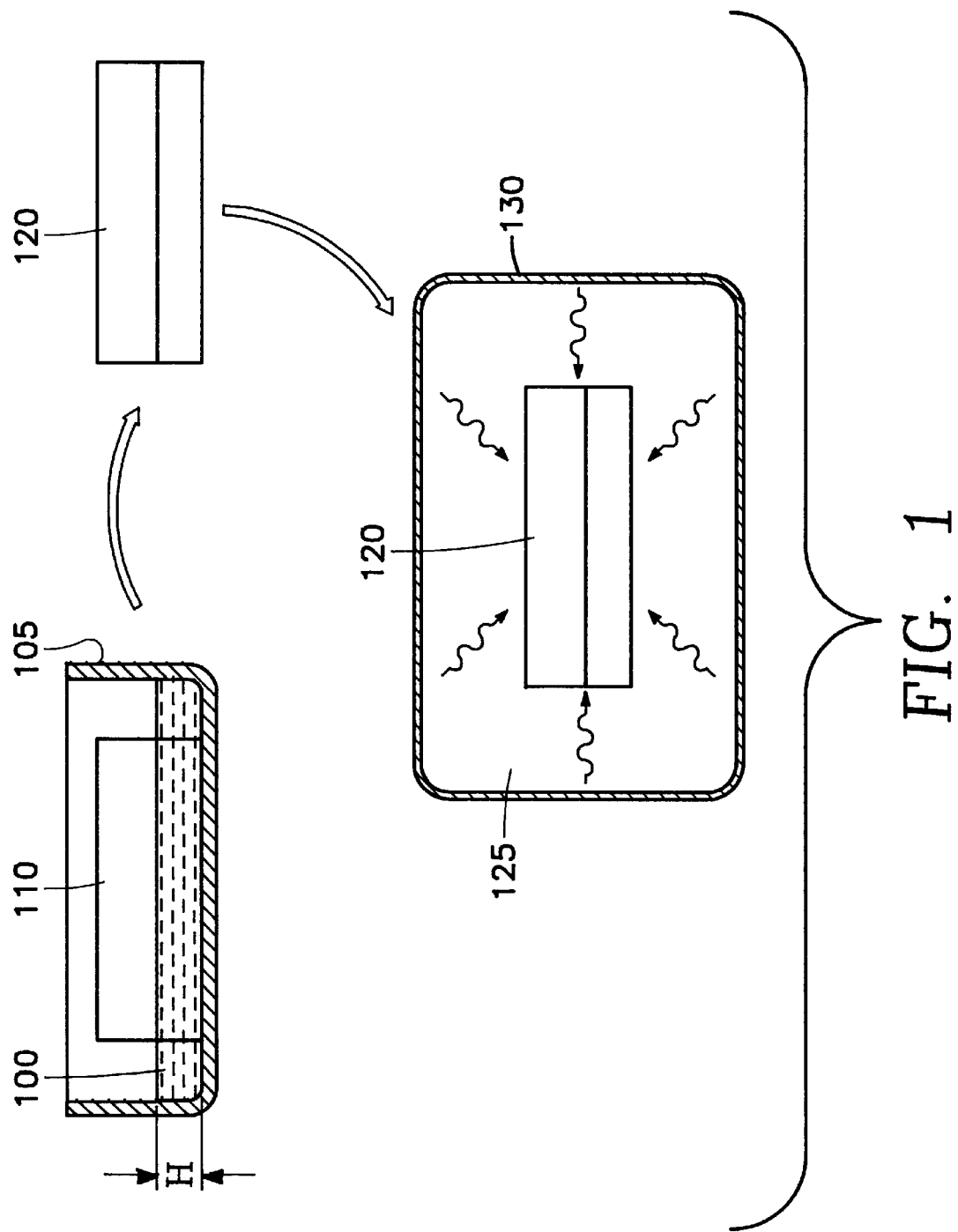
FIG. 1 is a pictorial diagram of the infiltration, curing and pyrolyzing steps of the invention.

The method used to create an abrasion resistant ceramic insulation tile is to densify the tile surface. This process increases the strength and hardness of the tile surface and, therefore, the abrasion resistance of the tile.

As shown in FIG. 1, a polymeric precursor 100, which is also referred to as a preceramic resin or preceramic polymer, is poured into a container 105 up to a predetermined depth H. A ceramic insulation tile 110 is then placed in the container to allow the polymeric precursor 100 to soak into the tile to a depth H. The time required for this absorption to occur varies with the composition of the tile 110 and the polymeric precursor 100 as will be explained later.

After this soak step, the tile 110 with the absorbed polymeric precursor 100 is processed in accordance with the process steps specified by the manufacturer of the polymeric precursor to transform the absorbed precursor into a ceramic. For example, the absorbed tile 120 is cured at a low temperature for several hours in air. This step is typically followed by a high temperature pyrolyzing step in an inert atmosphere 125 (for non-oxide ceramic precursors), such as high purity argon or nitrogen. This step is usually performed in a standard furnace 130, at an elevated temperature.

The selection of the compositions for the tile 110 and preceramic polymer 100 are interdependent, and also dependent on the abrasion resistant properties desired to be achieved. For example, the material selected for the tile 110 must be porous enough to allow absorbtion of the preceramic polymer 100 that is selected while retaining the heat resistant properties for which the tile was selected for the operational environment, e.g., aircraft exhausts. Although a specific preferred porosity depends on the viscosity of the preceramic polymer 100 selected, ceramic porosities in the range of 50–95 percent open porosity will allow the extent of densification required to achieve the objects of the invention.

The preceramic polymer 100 selected must have a viscosity low enough to penetrate the porous tile 110 to a desired depth, which controls the properties to be achieved. The viscosity must not be too low, however, because this will cause the preceramic polymer 100 to be absorbed in an uncontrolled manner into the tile 110. For example, if the viscosity is too low, the preceramic polymer 100 will densify the entire tile 110 resulting a tile that is far too heavy for the intended application. If the viscosity is too high, the preceramic polymer 100 will not absorb deep enough into the tile 110 to create a dense ceramic layer having the desired properties.

Thus, it is an aspect of the invention to select the preceramic polymer 100 to have a viscosity that will be absorbed into a selected tile 110 to a depth that will increase the abrasion resistance of the tile to a desired degree. In addition, it is an aspect of the invention to select the preceramic polymer 100 to have a post-pyrolysis ceramic strength and toughness adequate to achieve the desired abrasion resistance. The type of preceramic polymer 100 and the depth to which it is absorbed in the tile 110 will determine the increase in such abrasion-related properties such as erosion resistance or impact resistance. Although a preferred viscosity is dependent on a specific porosity of tile 110, viscosities in the range of 1 to 400 centipoise will provide the extent of densification required to achieve the objects of the invention.

The depth that the preceramic polymer 100 will penetrate the tile 110 is also dependent on the interfacial forces that exist between the two materials. These forces determine the degree to which the preceramic polymer 100 will wet the tile 110 and, consequently, the depth to which the polymer will penetrate the tile.

Another aspect of the invention is that the method produces a densification of the tile 110 that is reproducible in production quantities. Initially, the uncomplicated nature of the process of the invention contributes substantially to this object. In addition, the viscosity of the preceramic polymer 100 and porosity of the tile 110 may be selected such that the polymer will be absorbed only up to the height H to which the tile is immersed in the polymer during the soak step described previously. Selection of the materials in this manner will ensure that the depth of densificaton, and resulting strength increases, will be reproducible. Of course, selection of the preceramic polymer 100 in this manner may not be possible if the preferred viscosity will not allow transformation into a ceramic with the desired strength and toughness properties.

The following working example demonstrates how the objects of the invention are achieved. In this embodiment, the preferred preceramic polymer 100 was formed with Blackglas™ 489D resin sold by the Allied Signal Corporation, which pyrolyzes to form a silicon-oxycarbide ceramic. This resin was mixed with 0.05 percent by weight of Blackglas 489B catalyst to form the preceramic polymer 100. This mixture was poured into a flat-bottomed container to an approximate depth of 0.10 inch. The tile used was an alumino-silicate ceramic insulation tile made by McDonnell Douglas Technologies Inc. that had a density of 16 lb/ft$^3$, which samples were 1 inch thick. The tile was placed in the container with the Blackglas mixture and allowed to soak for 15 seconds at room temperature, after which time the Blackglas mixture had absorbed into the tile to the depth of the mixture, i.e., 0.10 inch.

The tile was then removed from the soak container and the manufacturer's directions for curing were followed. Specifically, the absorbed tile was cured at 130 degrees Fahrenheit for three hours in air. The cured tile was then pyrolyzed in a (high purity) argon atmosphere at 1,500 degrees Fahrenheit for 3 hours to complete the surface densification process. The areal weight gain for this densification method was typically 0.035 lb/ft$^3$.

The abrasion resistance of both the untreated and densified tiles was measured using a Taber abrader device. This test uses an abrasive wheel that runs a circular track around a 4 inch by 4 inch sample surface. Following the abrasion, the depth of wear and weight loss is measured to quantify the abrasion resistance. The Taber abrasion tests were performed for 100 rotations at 70 rpm using a CS-17 wheel and a mass of 500 grams. Shore hardness A tests were also performed on both tiles to evaluate their hardness.

Table 1 shows the results of testing on both the untreated and densified tiles. The hardness of the tile was increased from 62 in the untreated state to 90 after the densification with Blackglas. The 100 cycle weight loss for the densified tile was greater than the untreated tile because of the higher density of the densified tile. The wear depth of the densified tile was 3.57 thousands of an inch ("mils"), which was considerably less than the wear depth of the untreated tile which was 5.86 mils. This latter test represents a significant improvement in abrasion resistance of approximately 40 percent.

TABLE 1

| Type | Hardness (Shore A) | 100-Cycle Weight Loss (g) | Wear Depth (mils) |
| --- | --- | --- | --- |
| Bare | 62* | 1.32* | 5.86 |
| Densified | 90* | 2.81* | 3.57 |

*average of two tests

The method of the invention can be used with a range of porous oxide and non-oxide ceramics, such as those used for high temperature insulation tiles. Such porous ceramics include those made from alumina, alumina silicate, silicon carbide (a non-oxide ceramic), mullite and zirconia. The porosity may be created and controlled by a variety of processes, including chemical vapor deposition, a slurry dip process, powder processing or the use of a blowing agent to foam these materials.

A range of polymeric precursors may be used with these porous ceramics to produce an abrasion resistant ceramic, including Tonen "PHPS-1" and "PHPS-2" (by Tonen Corporation of Tokyo, Japan), polyvinylsilane or "PVS" (by Union Carbide Corporation of Danbury, Conn.), or SwRI silicon nitrate (by Southwest Research Institute of San Antonio, Tex.) or Starfire silicon carbide (by Starfire Corporation of Watervliet, N.Y. ). In addition, any of the spirosiloxane oligomers and polymers that are precursors to a silicon carboxide ceramic or "black glass" (e.g. "Blackglas" by Allied-Signal) may also be used. In each case, the curing times and temperatures specified by the manufacturers are followed to densify the surface of the porous ceramic tile.

A range of depths H of the polymeric precursor to absorb into the porous ceramic tile can be used, depending on the desired properties to be achieved. Although it may be desirable to increase the depth H to increase the strength of the densified tile, this effect must be balanced against the increased weight due to the densified ceramic which may be undesirable for the intended application. In general, densification depths in the range of 0.050 to 0.500 inches provided reasonable increases in abrasion resistance with acceptable weight increases.

In another embodiment of the method, the following steps of the invention are repeated to increase the density of the infiltrated ceramic: infiltrating the porous ceramic with a polymeric precursor, curing the infiltrated polymeric precursor, and pyrolyzing the infiltrated polymeric precursor to form an infiltrated ceramic. The increased density of infiltrated ceramic results in increased strength and hardness.

Although the present invention has been described with reference to preferred embodiments, workers skilled in the art will recognize that changes may be made in form and detail without departing from the spirit and scope of the invention.

What is claimed:

1. An abrasion resistant ceramic insulation tile comprising:

a porous ceramic material having a surface; and a preceramic polymer permeating through the surface, said preceramic polymer forming an integral ceramic matrix with the porous ceramic material upon pyrolyzation.

2. The ceramic insulation tile of claim 1 wherein said porous ceramic material has a porosity in the range of approximately 50 to 95 percent open porosity.

3. The ceramic insulation tile of claim 1 wherein said porous ceramic material is an oxide ceramic.

4. The ceramic insulation tile of claim 3 wherein said oxide ceramic is selected from the group consisting of alumina, alumina silicate, mullite and zirconia.

5. The ceramic insulation tile of claim 1 wherein said porous ceramic material is a non-oxide ceramic.

6. The ceramic insulation tile of claim 5 wherein said non-oxide ceramic is silicon carbide.

7. The ceramic insulation tile of claim 1 wherein said preceramic polymer having a preceramic liquid state has a viscosity in the range of approximately 1 to 400 centipoise.

8. The ceramic insulation tile of claim 1 wherein said preceramic polymer is selected from the group consisting of a spirosiloxane oligomer, a spirosiloxane polymer, and a polyvinylsilane.

9. The ceramic insulation tile of claim 1 wherein said preceramic polymer is permeated through the surface to a thickness in the range of approximately 0.050 to 0.500 inches.

* * * * *

UNITED STATES PATENT AND TRADEMARK OFFICE
CERTIFICATE OF CORRECTION

PATENT NO.   :   5,904,997
DATED        :   May 18, 1999
INVENTOR(S)  :   David Eric Daws, Harry Wellington Carpenter and
                 Michael Thomas Hahn It is certified that error appears in the above-identified patent and that said Letters Patent is hereby corrected as shown below:

Title page, item
[75] Inventors: add

--Michael Thomas Hahn--

Signed and Sealed this

Second Day of November, 1999

Attest:

Q. TODD DICKINSON

Attesting Officer

Acting Commissioner of Patents and Trademarks